(12) United States Patent
Mori (10) Patent No.: US 9,393,840 B2
(45) Date of Patent: Jul. 19, 2016

(54) PNEUMATIC TIRE

(75) Inventor: Akiko Mori, Ome (JP)

(73) Assignee: BRIDGESTONE CORPORATION, Tokyo (JP)

(*) Notice: Subject to any disclaimer, the term of this patent is extended or adjusted under 35 U.S.C. 154(b) by 1021 days.

(21) Appl. No.: 13/347,992

(22) Filed: Jan. 11, 2012

(65) Prior Publication Data

US 2012/0175031 A1    Jul. 12, 2012

(30) Foreign Application Priority Data

Jan. 11, 2011    (JP) ................................. 2011-003025

(51) Int. Cl.
*B60C 11/12* (2006.01)
*B60C 11/03* (2006.01)
(Continued)

(52) U.S. Cl.
CPC ......... *B60C 11/0306* (2013.04); *B60C 11/0309* (2013.04); *B60C 11/11* (2013.01); *B60C 11/12* (2013.01); *B60C 11/1272* (2013.04); *B60C 11/042* (2013.04); *B60C 2011/0383* (2013.04);
(Continued)

(58) Field of Classification Search
CPC ............... B60C 2200/06; B60C 2200/065; B60C 11/0304; B60C 11/1272; B60C 11/12; B60C 11/0309; B60C 11/0306; B60C 11/042; B60C 11/04; B60C 11/11; B60C 2011/0304; B60C 2011/1286; B60C 2011/1213; B60C 2011/0346; B60C 2011/0383; B60C 2011/0386
USPC ......... 152/209.27, 209.9, 209.8, DIG. 3, 900, 152/901, 902, 209.18
See application file for complete search history.

(56) References Cited

U.S. PATENT DOCUMENTS

| 5,804,000 A * | 9/1998 | Shirai ................. B60C 11/0306 152/209.15 |
| 6,203,640 B1 * | 3/2001 | Campana et al. .......... 156/110.1 |
| 2006/0102267 A1 * | 5/2006 | Takahashi et al. ........ 152/209.18 |

FOREIGN PATENT DOCUMENTS

| CN | 101574904 A | 11/2009 |
| EP | 0 887 209 A2 | 12/1998 |

(Continued)

OTHER PUBLICATIONS

Machine translation of JP08-282213 (no. date).*
(Continued)

*Primary Examiner* — Michael H Wilson
*Assistant Examiner* — Philip N Schwartz
(74) *Attorney, Agent, or Firm* — Sughrue Mion, PLLC (57) ABSTRACT

A pneumatic tire with good fuel efficiency, drainage performance and uneven wear resistance is provided. A pneumatic tire has a tread surface provided with circumferential main grooves to define a center region and two side regions. The center region is provided with a first circumferential narrow groove and second circumferential narrow grooves located between the first circumferential narrow groove and the circumferential main grooves; and center rib-like land portions including first center rib-like land portions defined by the first circumferential narrow groove and the second circumferential narrow grooves, and second center rib-like land portions defined by the second circumferential narrow grooves and the circumferential main grooves. The center rib-like land portions located next to each other with the center circumferential narrow grooves being therebetween are adapted to supportingly contact with each other. The second circumferential narrow groove has a width larger than that of the first circumferential narrow groove.

5 Claims, 6 Drawing Sheets (51) Int. Cl.
*B60C 11/11* (2006.01)
*B60C 11/04* (2006.01)

(52) U.S. Cl.
CPC . *B60C 2011/1213* (2013.04); *B60C 2011/1286* (2013.04); *B60C 2200/06* (2013.04)

(56) References Cited

FOREIGN PATENT DOCUMENTS

| | | |
|---|---|---|
| EP | 1 695 843 A1 | 8/2006 |
| JP | 51-22255 | 7/1976 |
| JP | 8-282213 A | 10/1996 |
| JP | 2000-177333 A | 6/2000 |
| JP | 2003-252009 A | 9/2003 |
| JP | 2006-143019 A | 6/2006 |
| JP | 2006-341769 A | 12/2006 |
| JP | 2007-038924 A | 2/2007 |
| JP | 2008-62704 A | 3/2008 |
| JP | 2009-202639 A | 9/2009 |
| JP | 2010-111319 A | 5/2010 |
| WO | 2011/121421 A1 | 10/2011 |

OTHER PUBLICATIONS

Chinese Office Action, dated Aug. 6, 2014, issued in corresponding Chinese Patent Application No. 201210010898.1.
Japanese Office Action, dated Jun. 10, 2014, issued in corresponding Japanese Patent Application No. 2011-003025.
Chinese Office Action, dated Dec. 24, 2013, issued in corresponding Chinese Patent Application No. 201210010898.1.
Extended European Search Report issued in European Application No. 12150842.8 dated May 2, 2012.
Japanese Office Action issued in Japanese Application No. 2011-003025 dated Oct. 7, 2014.
European Office Action issued in European Application No. 12150842.8 dated Dec. 12, 2014.
Chinese Office Action, dated Jan. 19, 2015, issued in corresponding Chinese Patent Application No. 201210010898.1.

* cited by examiner

PNEUMATIC TIRE

BACKGROUND OF THE INVENTION

1. Field of the Invention

The present invention relates to a pneumatic tire with good fuel efficiency, drainage performance and uneven wear resistance, especially to a tire for a heavy load vehicle such as a truck and a bus.

2. Description of Related Art

Figure 6:
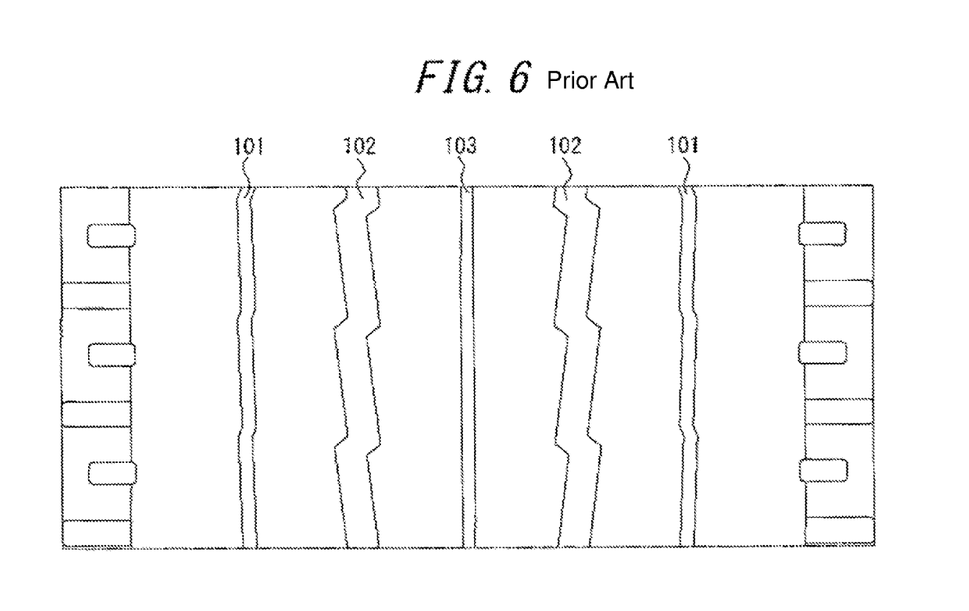
FIG. 6 is a partial development view of a tread portion of the conventional tire.

A pneumatic tire, especially a heavy load pneumatic tire for a heavy load vehicle such as a truck and a bus may have a so-called rib-like pattern where, as shown in FIG. 6, a tread surface is provided with a plurality of circumferential main grooves extending along the circumferential direction of the tire to define a plurality of rib-like land portions on the tread surface, or a so-called block-like pattern where a tread surface is provided with a plurality of circumferential main grooves extending along the circumferential direction of the tire and widthwise main grooves extending along the widthwise direction of the tire to define a plurality of block-like land portions on the tread surface.

In the tire having a rib-like pattern, the total opening length of provided grooves and sipes is small, and thus edge component resided in the ground contact area is small, whereby an improvement in wet performance by virtue of an edge effect cannot be expected. Nevertheless, it is possible to increase the widths of circumferential main grooves to secure drainage performance. With respect to a reduction of rolling resistance contributing to fuel efficiency, since the rib-like land portions integrally extend along the circumferential direction of the tire, stiffness of the land portions against input forces in the circumferential direction of the tire that act during driving and/or braking of the vehicle increases, and thus the deformation of the land portions can be suppressed; however, since the rib-like land portions are divided from each other by the circumferential main grooves with relatively large widths, the input forces in the widthwise direction of the tire that act during cornering or the like of the vehicle tends to increase the deformation of the land portions in some extent. Therefore, the overall rolling resistance cannot be sufficiently suppressed. In addition, regions of rib-like land portions located adjacent to the circumferential main grooves with relatively large widths have larger local shear deformation in the ground contact area and suffer from enhanced wear, which arises a problem that the regions become cores of uneven wear.

As a tire having a rib-like pattern intended to improve drainage performance as well as reduce rolling resistance, for example, JP 2000177333 A describes a pneumatic tire having a tread pattern in which rib-like land portions are provided with a plurality of the widthwise narrow grooves having a width of 0.5-1.5 mm and extending along the widthwise direction of the tire to dividingly form block-like land portions; and the block-like land portions are provided with closed sipes inclining in the direction opposite to the widthwise narrow grooves with respect to the axial direction of the tire.

BRIEF SUMMARY OF THE INVENTION

Problems to be Solved by the Invention

In the pneumatic tire described in JP 2000177333 A, by providing the widthwise narrow grooves and the closed sipes in the rib-like land portions instead of increasing the widths of circumferential main grooves, the edge components resided in the ground contact area has been efficiently increased, and thus drainage performance has been improved. However, in this tire, the provided widthwise narrow grooves divide the rib-like land portions into the block-like land portions, and accordingly each block-like land portion has substantially been separated by the widthwise narrow grooves to reduce the stiffness of the land portions against input forces in widthwise direction of the tire. This involves an increase in the amount of deformation of block-like land portions in the widthwise direction of the tire, and thus an insufficient reduction of the rolling resistance of the tire. Therefore, a further improvement is needed.

On the other hand, a tire having a block-like pattern has block-like land portions each defined by the circumferential main grooves and the widthwise main grooves, whereby it has larger edge components resided in the ground contact area, and thus has advantage in drainage performance. However, the block-like land portions located next to each other with the circumferential main grooves or the widthwise main grooves being therebetween do not contact with each other when they are in the ground contact area, and accordingly each block-like land portion exerts the stiffness independently. This not only increases the amount of deformation of each block-like land portion due to its smaller stiffness, and thus increases rolling resistance of the tire, but may often cause uneven wear such as so-called heel and toe wear where the block-like land portions are worn partially at the leading and trailing ground contact ends.

The object of the present invention is to propose a pneumatic tire, especially a heavy load pneumatic tire for a heavy load vehicle such as a truck and a bus, with good fuel efficiency, drainage performance and uneven wear resistance by appropriately providing narrow grooves to define land portions in the center region of the tread surface.

Means for Solving the Problems

To achieve the above-described object, this invention provides a pneumatic tire comprising a tread surface provided, on both sides of a pattern center, with a pair of circumferential main grooves extending along a circumferential direction of the tire to define a center region located between the pair of circumferential main grooves, and two side regions located in both sides of the center region, wherein the center region is provided with center circumferential narrow grooves including a first circumferential narrow groove located adjacent to the pattern center and extending along the circumferential direction of the tire; a pair of second circumferential narrow grooves located between the first circumferential narrow groove and the respective circumferential main grooves and extending along the circumferential direction; and a plurality of center rib-like land portions including first center rib-like land portions defined by the first circumferential narrow groove and the respective second circumferential narrow grooves, and second center rib-like land portions defined by the respective second circumferential narrow grooves and the respective circumferential main grooves, the center rib-like land portions located next to each other with the center circumferential narrow grooves being therebetween are adapted to supportingly contact with each other, and the second circumferential narrow groove has a width, preferably within a range of 2.0 mm-3.0 mm, larger than that of the first circumferential narrow groove, preferably within a range of 0.5 mm-1.5 mm.

Preferably, the center rib-like land portions is further provided with a plurality of first widthwise grooves extending along a widthwise direction of the tire to dividingly form an array of center block-like land portions, and the center block-like land portions located next to each other with the first widthwise groove being therebetween are also adapted to supportingly contact with each other.

In addition, the second center rib-like land portion preferably has a width larger than that of the first center rib-like land portion, and more preferably, the width of the second center rib-like land portion is more than 100% and not more than 115% of the width of the first center rib-like land portion.

Moreover, the center circumferential narrow groove preferably has a zigzag shape formed by circumferentially alternately arranging first groove portions extending at a given first inclination angle from the circumferential direction of the tire and second groove portions extending at a given second inclination angle inversely from the circumferential direction of the tire, and more preferably, the inclination angles of the first and second groove portions of the first circumferential narrow groove are larger than the inclination angles of the respective groove portions of the second circumferential narrow groove, for example, the inclination angles of the first and second groove portions of the first circumferential narrow groove are not more than 50 degrees, the inclination angles of the first and second groove portions of the second circumferential narrow groove are not more than 40 degrees, and the inclination angles of the first and second groove portions of the first circumferential narrow groove are 5-30 degrees larger than the respective ones of the first and second groove portions of the second circumferential narrow groove.

Effect of the Invention

According to the present invention, it is possible to provide a pneumatic tire with good fuel efficiency, drainage performance and uneven wear resistance, especially a tire for heavy load vehicle such as truck and/or bus by appropriately defining the land portion located in the center region of the tread surface by several kinds of narrow grooves.

DETAILED DESCRIPTION OF THE INVENTION

Hereinafter, an embodiment of the present invention will be explained with reference to drawings.

Figure 1:
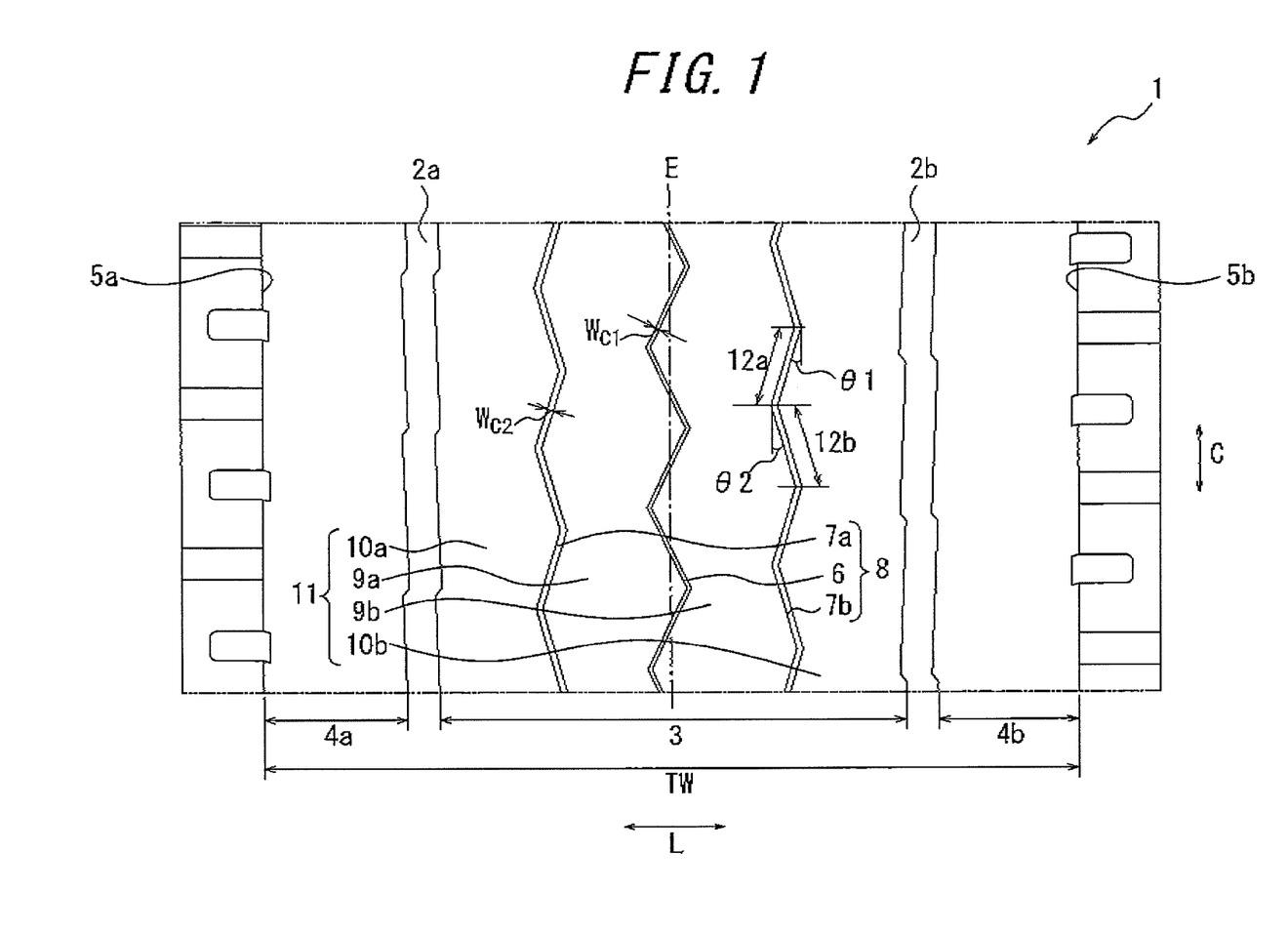
FIG. 1 is a partial development view of a tread portion of a pneumatic tire according to the present invention.

FIG. 1 shows a part of a tread portion (or a tread pattern) of a pneumatic tire according to the present invention.

A pneumatic tire having the tread portion 1 shown in FIG. 1 has a tread surface provided with a pair of circumferential main grooves 2a, 2b extending along a circumferential direction of the tire C on both sides of a pattern center, which is consistent with the tire equator E in FIG. 1, to define a center region 3 located between the pair of circumferential main grooves 2a, 2b, and two side regions 4a, 4b located in both sides of the center region 3. The pattern center may be arranged to be consistent with the position of the tire equator E or to be spaced from the tire equator E within 15% of the tread width in the widthwise direction.

The term "center region" as used herein represents the region of tread surface positioned within the range of 40%-65% of the tread width TW with the tire equator E being as its center. The term "side region" as used herein represents the region of tread surface which is positioned widthwise outer side of a center region 3 located between the circumferential main grooves 2a, 2b and which is defined by the circumferential main grooves 2a, 2b and tread ends 5a, 5b, respectively.

The major characteristics of the constitution of the present invention is to appropriately provide narrow grooves to define the land portion in the center region 3 of the tread surface. Specifically, the center region 3 is provided with center circumferential narrow grooves 8 including a first circumferential narrow groove 6 located adjacent to the pattern center E and extending along the circumferential direction of the tire C; a pair of second circumferential narrow grooves 7a, 7b located between the first circumferential narrow groove 6 and the respective circumferential main grooves 2a, 2b and extending along the circumferential direction C; and a plurality of center rib-like land portions 11 including first center rib-like land portions 9a, 9b defined by the first circumferential narrow groove 6 and the respective second circumferential narrow grooves 7a, 7b, and second center rib-like land portions 10a, 10b defined by the respective second circumferential narrow grooves 7a, 7b and the respective circumferential main grooves 2a, 2b. The center rib-like land portions 10a and 9a, 9a and 9b, and 9b and 10b located next to each other with the center circumferential narrow grooves 8 being therebetween are adapted to supportingly contact with each other. The second circumferential narrow grooves 7a, 7b have a width $W_{c2}$ larger than that of the first circumferential narrow groove 6 $W_{c1}$. This constitution is employed to satisfy high fuel efficiency, high drainage performance and high uneven wear resistance in a well-balanced fashion.

In a preferred embodiment, drainage performance can be secured by providing a pair of circumferential main grooves 2a, 2b with relatively large width that define the center region 3 and the side regions 4a, 4b.

In addition, this invention adopt the constitution that the center region 3 is provided with center circumferential narrow grooves 8 including a first circumferential narrow groove 6 located adjacent to the pattern center E and extending along the circumferential direction of the tire C; a pair of second circumferential narrow grooves 7a, 7b located between the first circumferential narrow groove 6 and the respective circumferential main grooves 2a, 2b and extending along the circumferential direction C; and a plurality of center rib-like land portions 11 including first center rib-like land portions 9a, 9b defined by the first circumferential narrow groove 6 and the respective second circumferential narrow grooves 7a, 7b, and second center rib-like land portions 10a, 10b defined by the respective second circumferential narrow grooves 7a, 7b and the respective circumferential main grooves 2a, 2b. The center rib-like land portions 10a and 9a, 9a and 9b, and 9b and 10b located next to each other with the center circumferential narrow grooves 8 being therebetween are adapted to supportingly contact with each other, such that, when in contact with the ground, the center rib-like land portions 10a and 9a, 9a and 9b, and 9b and 10b located in the center region 3 together can bear not only input forces in the circumferential direction of the tire C but also input forces in the widthwise direction of the tire L, whereby total amount of the deformations of the center lib-like land portions 9a, 9b, 10a and 10b located in the center region 3 can be effectively suppressed.

Accordingly this constitution can significantly suppress rolling resistance of the tire.

Furthermore, this invention adopts the constitution that the second circumferential narrow grooves 7a, 7b has a groove width $W_{c2}$ larger than a groove width $W_{c1}$ of the first circumferential narrow groove 6, such that the effect of mutual support between the second center rib-like land portions 10a, 10b and the center lib-like land portions, which are the first center rib-like land portions 9a, 9b in FIG. 1, located next to them across the second circumferential narrow grooves 7a, 7b when the tire is in contact with the ground can be reduced as compared with the effect of mutual support between the center rib-like land portions, which are the first center rib-like land portions 9a, 9b in FIG. 1, located next to each other across the first circumferential narrow groove 6 (in other words, the degree of the supporting contact can be reduced). This can suppress large deformations occurring only locally at the end portions of the second center rib-like land portions 10a, 10b located adjacent to the circumferential main grooves 2a, 2b, and accordingly allows the entire second center rib-like land portions 10a, 10b to be uniformly deformed. As a result, the uneven wear resistance of the center lib-like land portions 9a, 9b, 10a and 10b located in the center region 3 of tread portion 1 can be remarkably improved.

The term "when the tire is in contact with the ground" as used herein specifically represents a condition where the tire is mounted on an applicable rim, inflated with a specified internal pressure, and placed on a flat plate in a resting state, and then the normal load is vertically applied to the tire. The term "applicable rim" as used herein refers to a "standard rim" specified under JATMA, "Design Rim" specified under TRA or "Measuring Rim" specified under ETRTO. The term "specified internal pressure" as used herein refers to "an air pressure corresponding to the maximum load capability" specified under JATMA, "TIRE LOAD LIMITS AT VARIOUS COLD INFLATION PRESSURES" specified under TRA or "INFLATION PRESSURES" specified under ETRTO. The term "normal load" as used herein refers to a "maximum load capability" specified under JATMA, "TIRE LOAD LIMITS AT VARIOUS COLD INFLATION PRESSURES" specified under TRA or "LOAD CAPACITY" specified under ETRTO.

The width of the circumferential main grooves 2a, 2b is preferably not less than 5 mm to secure drainage performance. Meanwhile, in a case where the width of the circumferential main grooves 2a, 2b is more than 30 mm, the ratio of the area of tread land portion in the ground contact area of a tire is excessively small (i.e., the negative ratio is excessively large), which facilitates the reduction of wear resistance. Therefore, the upper limit of the widths of the circumferential main grooves 2a, 2b is preferably 30 mm.

The extending shape of the circumferential main grooves 2a, 2b may be a zigzag or wave shape. This is preferred in a point that edge components in the widthwise direction of the tire can be increased to improve driving performance, braking performance and/or drainage performance. It is also possible to form the circumferential grooves in a linear shape. Furthermore, circumferential main grooves 2a, 2b do not necessarily have an identical zigzag shape, and, alternatively, they may be provided with their positions shifted by a half pitch in the circumferential direction of the tire or provided with different amplitude and/or wavelength.

In addition, it is essential that each of the second circumferential narrow grooves 7a, 7b has the groove width $W_{c2}$ larger than the groove width $W_{c1}$ of the first circumferential narrow groove 6 in order to efficiently suppress uneven wear of the center rib-like land portions 9a, 9b, 10a and 10b located in the center region of the tread portion, especially of the second center rib-like land portions 10a, 10b adjacent to the circumferential main grooves 2a, 2b with relatively large widths, to, thereby, allow the entire tread portion to be uniformly worn. Specifically, the width $W_{c1}$ of the first circumferential narrow groove 6 is preferably within a range of 0.5 mm to 1.5 mm, and the widths $W_{c2}$ of the second circumferential narrow grooves 7a, 7b are within a range of 2.0 mm to 3.0 mm. When the width $W_{c1}$ of the first circumferential narrow groove 6 is less than 0.5 mm, there is a tendency that a significant improvement of the drainage performance cannot be observed as compared to a land portion with which no circumferential narrow groove is provided. Meanwhile, when the width $W_{c1}$ of the first circumferential narrow groove 6 is more than 1.5 mm, the difference between it and the width $W_{c2}$ of the second circumferential narrow groove 7a, 7b becomes small, so that there is a tendency that the uneven wear in the second center rib-like land portions 10a, 10b cannot be effectively suppressed. When the width $W_{c2}$ of the second circumferential narrow grooves 7a, 7b is less than 2.0 mm, the amount of deformation of the end portions of the second center rib-like land portions 10a, 10b adjacent to the circumferential main grooves 2a, 2b tends to be significantly larger than the amount of deformation of the end portions adjacent to the second circumferential narrow groove 7a, 7b. Meanwhile, when the width $W_{c2}$ of the second circumferential narrow groove 7a, 7b is more than 3.0 mm, the openings of the second circumferential narrow grooves 7a, 7b are hardly closed upon contacting the ground, which is likely to disturb the sufficient effect of mutual support of the center rib-like land portions 10a and 9a, 9b and 10b located next to each other across the second circumferential narrow grooves 7a, 7b. It is noted that, if the uneven wear needs to be further suppressed, the difference $W_{c2}-W_{c1}$ between the width $W_{c1}$ of the first circumferential narrow groove 6 and the width $W_{c2}$ of the second circumferential narrow grooves 7a, 7b preferably falls within a range of 0.5 mm to 2.5 mm.

The center circumferential narrow grooves 8 including the first circumferential narrow groove 6 and the second circumferential narrow grooves 7a, 7b preferably have a zigzag shape formed by circumferentially alternately arranging first groove portions 12a extending at a given first inclination angle θ1 from the circumferential direction of the tire and second groove portions 12b extending at a given second inclination angle θ2 inversely from the circumferential direction of the tire, as shown in FIG. 1, from a view point of increasing edge components in the widthwise direction of the tire, and thus improving driving performance, braking performance and/or drainage performance. The center circumferential narrow grooves 8, however, may have a linear shape.

The first circumferential narrow groove 6 and the second circumferential narrow grooves 7a, 7b of the zigzag shaped center circumferential narrow grooves 8 do not necessarily have the same zigzag shape. Alternatively, they may be arranged to be mutually offset by a half pitch in the circumferential direction or to have a different amplitude and/or wavelength. From a view point that the drainage performance due to the first narrow groove 6 is improved, both of the first inclination angle θ1 of the first groove portions 12a and the second inclination angle θ2 of the second groove portions 12b are preferably larger in the first circumferential narrow groove 6 than in the second circumferential narrow grooves 7a, 7b, and more preferably 50 degrees or less in the first circumferential narrow groove 6, 40 degrees or less in the second circumferential narrow grooves 7a, 7b, 5-30 degrees larger in the first circumferential narrow groove 6 than in the second circumferential narrow groove 7a, 7b. When at least one of the first inclination angle θ1 and the second inclination angle θ2 of the first circumferential narrow groove 6 is more than 50 degrees, the corner portions of the land portions have acute shapes that reduce the stiffness of the corner portions and may cause a problem such as rubber chipping. When at least one of the first inclination angle θ1 and the second inclination angle θ2 of the second circumferential narrow grooves 7a, 7b are more than 40 degrees, the corner portions have acute shapes that increase their displacements and may cause a problem that the corner portions tend to be cores of uneven wear. It is noted that the first inclination angle θ1 of the first groove portions 12a and the second inclination angle θ2 of the second groove portions 12b are preferably the same, but they may be different as far as the above-described preferable ranges are satisfied.

From a view point of securing the stiffness of the second center rib-like land portions 10a, 10b, the widths of the second center rib-like land portions 10a, 10b are preferably larger than those of the first center rib-like land portions 9a, 9b, and more preferably more than 100% and not more than 115% of the widths of the first center rib-like land portions 9a, 9b. Since the second center rib-like land portions 10a, 10b are defined by the circumferential main grooves 2a, 2b having relatively broader widths and the second circumferential narrow grooves 7a, 7b, respectively, having the widths larger than the width of first circumferential narrow groove 6, the effect of mutual support between the land portions upon contacting the ground is small. Accordingly, the second center rib-like land portions 10a, 10b preferably have widths larger than those of the first center rib-like land portions 9a, 9b. When the widths of the second center rib-like land portions 10a, 10b are larger than 115% of the widths of the first center rib-like land portions 9a, 9b, the stiffness of either second center rib-like land portions 10a, 10b is excessively larger than that of the first center rib-like land portions 9a, 9b, respectively to generate a stepwise stiffness variation and thus cause unpreferable uneven wear such as so-called center rib punch wear (step-down wear).

The widths of the first and second center rib-like land portions 9a, 9b, 10a, 10b vary along the circumferential direction of the tire in a case where the center circumferential narrow grooves 8 and/or the circumferential main grooves 2a, 2b have a zigzag extending shape. In this case, each width of the first and second center rib-like land portions 9a, 9b, 10a, 10b refers to the value obtained by dividing the sum of the respective maximum and minimum widths by 2.

Figure 2:
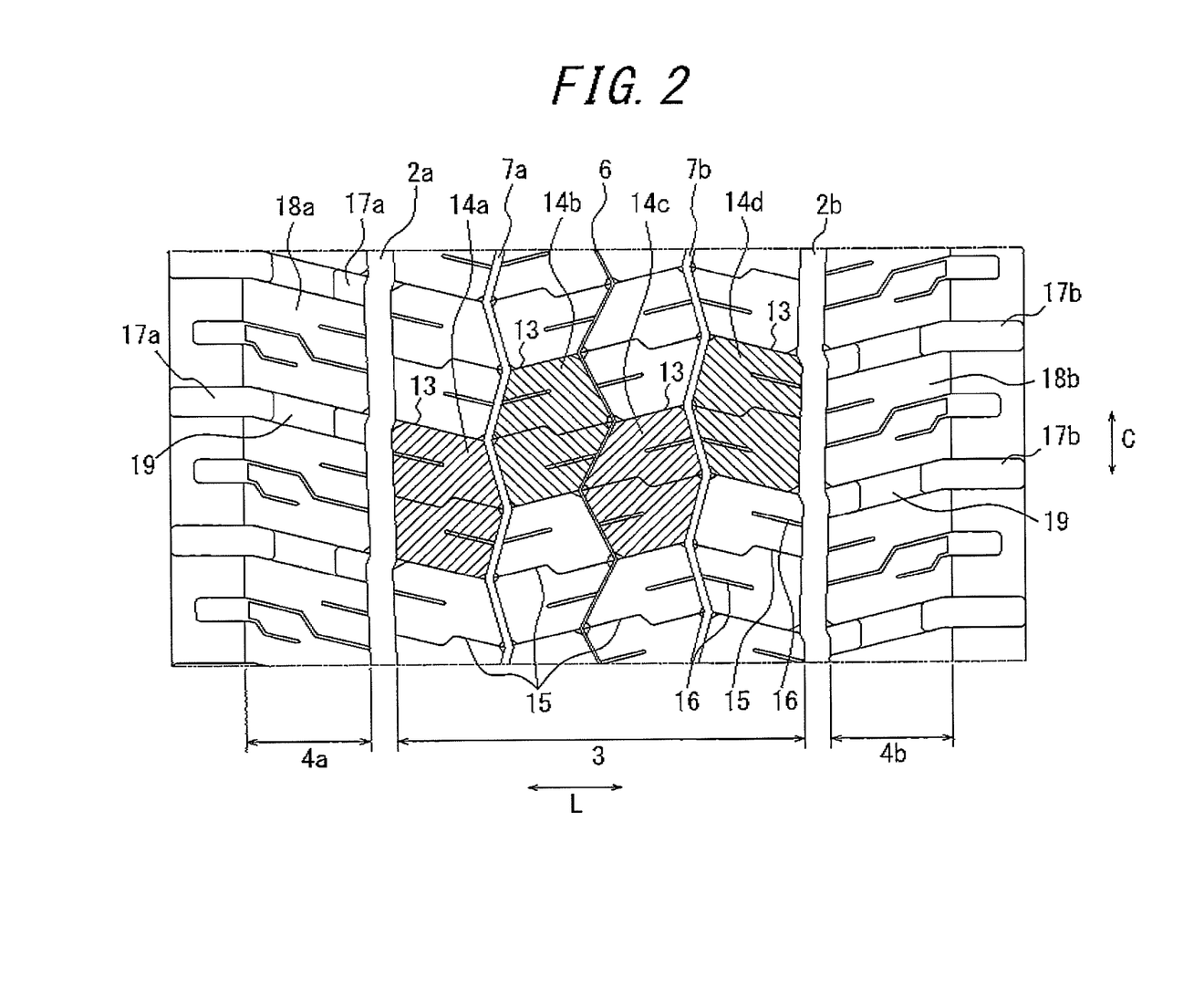
FIG. 2 is a partial development view of a tread portion of another pneumatic tire according to the present invention.

Preferably, as shown in FIG. 2, the center rib-like land portions 9a, 9b, 10a, 10b are further provided with a plurality of first widthwise narrow grooves 13 extending along a widthwise direction of the tire L to dividingly form an array of center block-like land portions including a plurality of the center block-like land portions 14a, 14b, 14c, 14d, and pairs of the center block-like land portions 14a and 14a, 14b and 14b, 14c and 14c, 14d and 14d located next to each other with the first widthwise narrow groove 13 being therebetween are adapted to supportingly contact with each other, from a view point that the entire land portions located in the center region 3 retain their stiffness and the center rib-like land portions 9a, 9b, 10a, 10b suppress their deformation, while edge components are effectively increased and drainage performance is further improved. It is noted that, in FIG. 2, for convenience of explanation, respective ones of center block-like land portions 14a, 14b, 14c, 14d are shown as shaded areas.

The width of the first widthwise narrow groove 13 is preferably no more than 3 mm, and more preferably no more than 1.5 mm, such that at least a part of the openings of the first widthwise narrow groove 13 can close upon contacting with the ground (when the tire is rotated with load applied thereon) to avoid the increase of rolling resistance of a tire. The first widthwise narrow groove 13 preferably extends at 55-125 degrees from the circumferential direction of the tire to secure the stiffness of the corner portions of land portions defined by the first widthwise narrow grooves 13 and prevent rubber chipping.

In the embodiment shown in FIG. 2, in order to further increase the edge components, each center block-like land portions 14a, 14b, 14c, 14d is provided with the second widthwise narrow groove 15 extending along a widthwise direction of the tire L in a crank manner to dividingly form two small block-like portions, and each small block-like portion is provided with a third widthwise narrow groove 16 extending along a widthwise direction of the tire L and terminating in the land portion. It is noted that such constitutions are optional and may arbitrarily be eliminated.

As shown in FIG. 2, the land portions located in the side regions 4a, 4b may be provided with a plurality of widthwise main grooves 17a, 17b extending along a widthwise direction of the tire L to dividingly form a plurality of the side block-like land portions 18a, 18b, whereby drainage performance towards the side direction of the tire can be improved. The widths of the widthwise main grooves 17a, 17b are preferably within a range of 4 mm-18 mm. When the widths of the widthwise main grooves 17a, 17b are less than 4 mm, the drainage performance towards the side direction of the tire is not sufficiently improved, whereas when the widths are more than 18 mm, a resulting reduction of the ground contact area deteriorates driving stability, and a resulting reduction of each side block-like land portion 18a, 18b reduces the stiffness of the land portions and accordingly facilitates the deformation of the side block-like land portions 18a, 18b, which increases rolling resistance. The widthwise main grooves 17a, 17b preferably extend at 50-90 degrees from the circumferential direction of the tire.

In addition, the widthwise main grooves 17a, 17b are preferably provided with the protruding shallow portions 19 that connect the side block-like land portions 18a and 18a, 18b and 18b located next to each other with the widthwise main grooves 17a, 17b being therebetween. This sufficiently suppresses the deformation of the side block-like land portions 18a, 18b without sacrificing drainage performance.

Preferably, the protruding shallow portions 19 have the extending lengths 0.3-0.8 times the widths of the side block-like land portions 18a 18b, and the heights from the bottom of the widthwise main grooves 17a, 17b 0.5-0.8 times the depths of the widthwise main grooves 17a, 17b. When the extending lengths of the protruding shallow portions 19 are less than 0.3 times the widths of the side block-like land portions 18a 18b, a resulting reduction of the stiffness of the side block-like land portions 18a 18b may facilitate the occurrence of uneven wear. When the extending lengths of the protruding shallow portions 19 are more than 0.8 times the widths of the side block-like land portions 18a 18b, the shortage of edge components may occur in an end stage of the tire life and may result in the significant reduction of drainage performance towards the side direction of the tire. When the heights of the protruding shallow portions 19 are less than 0.5 times the depths of the widthwise main grooves 17a, 17b, the stiffness of block-like land portions may be decreased and uneven wear may easily occur. When the heights of the protruding shallow portions 19 are more than 0.8 times the depths of the widthwise main grooves 17a, 17b, the improvement of drainage performance towards the side direction of the tire, by virtue of the provision of the widthwise main grooves 17a, 17b may not be fully obtained.

Figure 3:
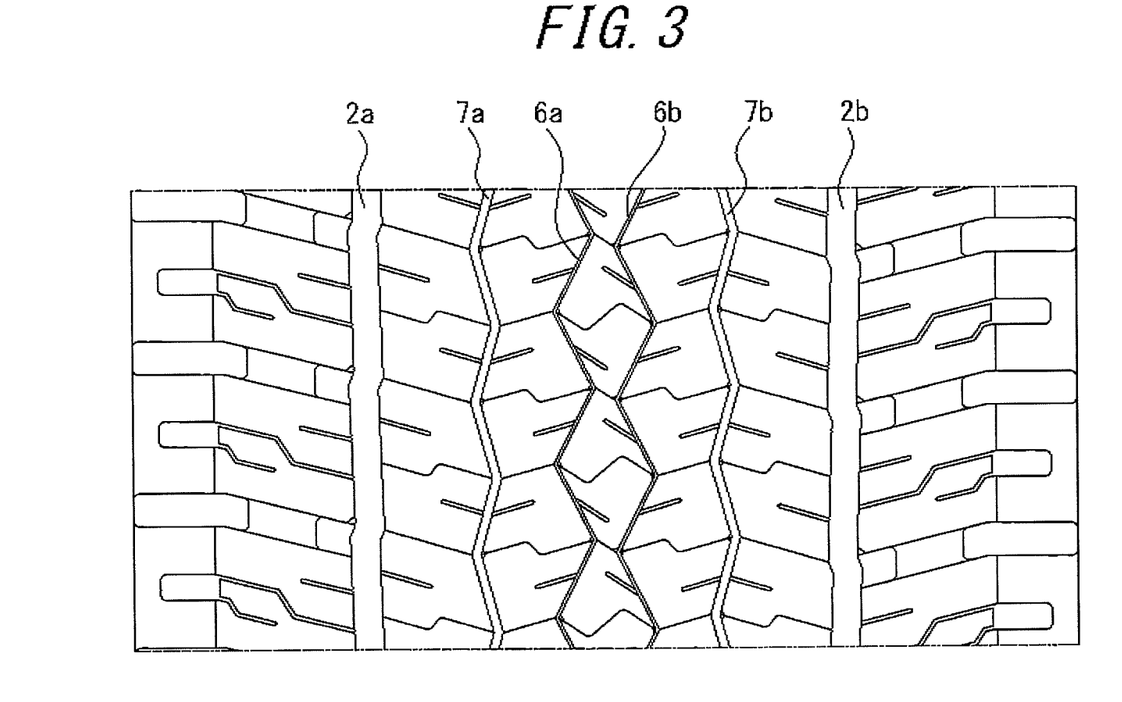
FIG. 3 is a partial development view of a tread portion of a further pneumatic tire according to the present invention.
Figure 4:
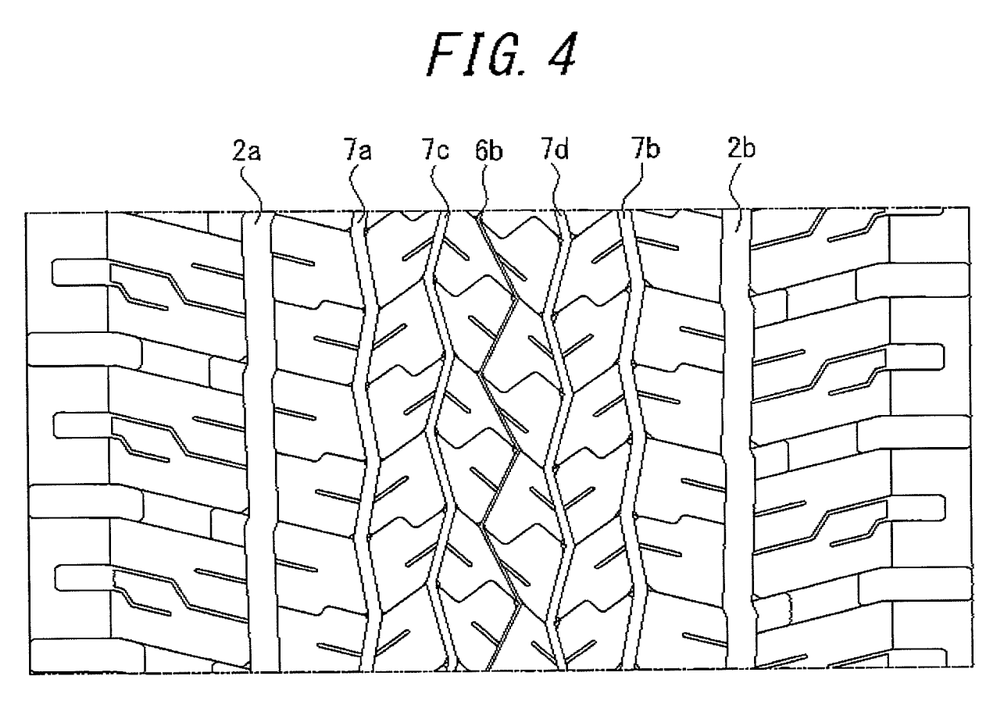
FIG. 4 is a partial development view of a tread portion of a further pneumatic tire according to the present invention.

As further embodiments a tire shown in FIG. 3 in which four center circumferential narrow grooves 8 consisting of two first circumferential narrow grooves 6a, 6b and a pair of second circumferential narrow grooves 7a, 7b are provided in the center region 3 of tread surface to define five center rib-like land portions, and a tire shown in FIG. 4 in which five center circumferential narrow grooves 8 consisting of one first circumferential narrow groove 6a and two pairs of second circumferential narrow grooves 7a, 7b, 7c, 7d are provided in the center region 3 of tread surface to define six center rib-like land portions may be recited by way of example. It is noted that, in the tire shown in FIG. 4, with respect to the groove widths of the two pairs of second circumferential narrow grooves 7a, 7b, 7c, 7d, the pair of second circumferential narrow grooves 7a, 7b located adjacent to the circumferential main grooves 2a, 2b preferably have widths larger than those of the pair of second circumferential narrow grooves 7c, 7d located adjacent to the first circumferential narrow groove 6 from a view point of suppressing uneven wear.

The present invention has been described with reference to the preferred embodiments. Various modification of this invention can be made or followed in light of the foregoing disclosure without departing from the spirit and scope of the claims.

EXAMPLES

Pneumatic radial tires for heavy load according to this invention were experimentally produced and their performances were evaluated as explained below.

Figure 5:
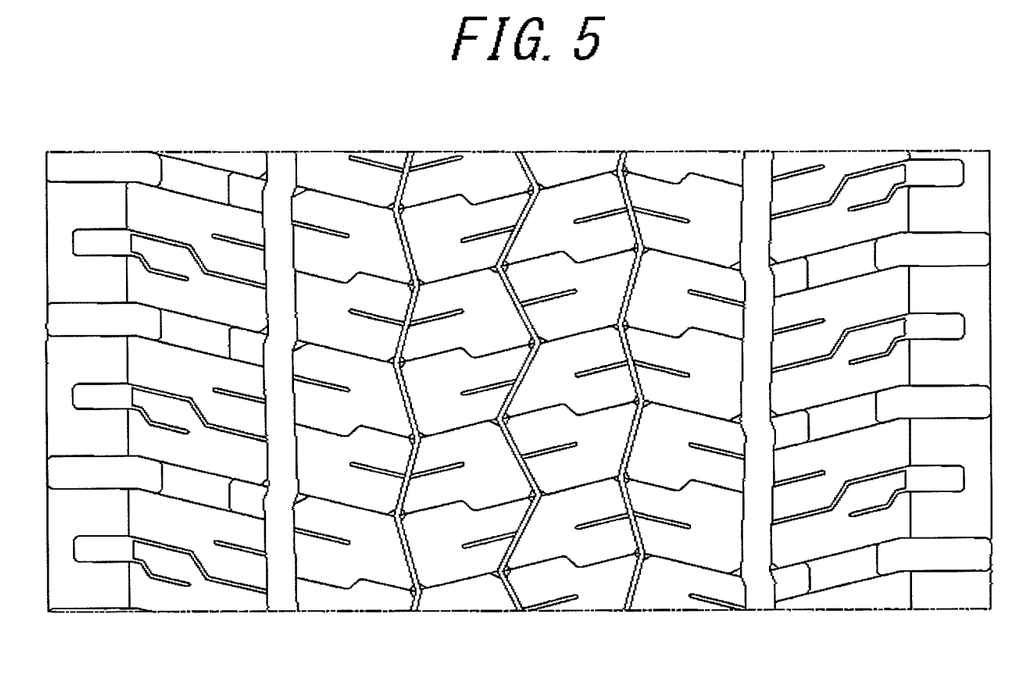
FIG. 5 is a partial development view of a tread portion of the comparative tire.

Example tires 1-3, each of which had the tread pattern shown in FIG. 2, a tire size of 315/80R22.5, and the specifications shown in Table 1, were prepared. This invention has a structural feature in the tread pattern, so that Example tires 1-3 were manufactured in the same manner as the conventional tire for heavy load except for the tread pattern. Comparative Example tire which had the tread pattern shown in FIG. 5 and Conventional Example tire which had the tread pattern shown in FIG. 6, both having a tire size of 315/80R22.5 and having the constant widths of the first and second circumferential narrow grooves, were also experimentally produced for the purpose of comparison.

TABLE 1

| | circumferential main grooves 2a, 2b | first circumferential narrow groove 6 | | second circumferential narrow groove 7a, 7b | | first widthwise groove 13 | second widthwise groove 15 | third widthwise groove 16 | |
|---|---|---|---|---|---|---|---|---|---|
| | Width (mm) | Width (mm) | Extending Shape | Width (mm) | Extending Shape | Width (mm) | Width (mm) | Width (mm) | Length (mm) |
| Conventional Example | width of side circumferential main grooves 101: 5.2 mm, width of middle circumferential main grooves 102: 13.0 mm, width of center circumferential main grooves 103: 5.0 mm | | | | | | | | |
| Comparative Example | 7 | 1.75 | zigzag shape $\theta_1 = +25°$ $\theta_2 = -25°$ | 1.75 | zigzag shape $\theta_1 = +15°$ $\theta_2 = -15°$ | 0.5 | 0.5 | 1.0 | 18 |
| Example 1 | 7 | 1.0 | zigzag shape $\theta_1 = +25°$ $\theta_2 = -25°$ | 2.5 | zigzag shape $\theta_1 = +15°$ $\theta_2 = -15°$ | 0.5 | 0.5 | 1.0 | 18 |
| Example 2 | 7 | 0.5 | zigzag shape $\theta_1 = +25°$ $\theta_2 = -25°$ | 3.0 | zigzag shape $\theta_1 = +15°$ $\theta_2 = -15°$ | 0.5 | 0.5 | 1.0 | 18 |
| Example 3 | 7 | 0.5 | zigzag shape $\theta_1 = +25°$ $\theta_2 = -25°$ | 3.0 | zigzag shape $\theta_1 = +15°$ $\theta_2 = -15°$ | 0.5 | 0.5 | 1.0 | 18 |

| | widthwise main grooves 17a, 17b | | protruding shallow portions 19 | | first center rib-like land portions 9a, 9b | second center rib-like land portions 10a, 10b | side block-like land portions 18a, 18b |
|---|---|---|---|---|---|---|---|
| | Width (mm) | Depth (mm) | Length (mm) | Height (mm) | Width (mm) | Width (mm) | Width (mm) |
| Conventional Example | width of side circumferential main grooves 101: 5.2 mm, width of middle circumferential main grooves 102: 13.0 mm, width of center circumferential main grooves 103: 5.0 mm | | | | | | |
| Comparative Example | 6 | 15 | 23 | 11 | 39 | 39 | 44 |
| Example 1 | 6 | 15 | 23 | 11 | 38 | 40 | 44 |
| Example 2 | 6 | 15 | 23 | 11 | 38 | 40 | 44 |
| Example 3 | 6 | 15 | 23 | 11 | 36 | 42 | 44 |

(Test methods) Each experimental tire described above was mounted on an applicable rim (rim size: 9.00), and fuel efficiency, drainage performance and uneven wear resistance were evaluated.

Rolling resistance of wheel axis was measured under the conditions of internal pressure of 900 kPa and normal load of 3187.5 kgf using a drum tester (at a speed of 80 km/h) equipped with a iron surface and having a diameter of 1.7 m. Fuel efficiency of the tire was evaluated based on rolling resistance measured. It is noted that the measurement of rolling resistance was performed in the force measurement principle with a smooth drum in accordance with ISO18164.

A vehicle equipped with the above described tire was driven at 30 km/h on a circle road with a radius of 20 m and 2 mm deep water thereon by a professional driver. The tire was applied with internal pressure of 900 kPa and standard load of 3,187.5 kgf. Drainage performance of the tire was evaluated based on the feeling of the driver.

The above described tire was attached to a driving axle of a 2-D tractor, and the tractor was driven on freeway for 200,000 km under the conditions of internal pressure of 900 kPa and normal load of 2,800 kgf, and then each wear volume of the first and second center rib-like land portions located in the center region of tread portion was measured. Uneven wear resistance of the tire was evaluated based on the difference of the wear volume of the first and the second center rib-like land portions (mm).

The results are shown in Table 2. In Table 2, both values of fuel efficiency and drainage performance are indicated by indices with the results Conventional Example tire as being 100, and the larger value means the higher quality.

TABLE 2

|  | Fuel Efficiency | Drainage Performance | Partial Wear Resistance |
| --- | --- | --- | --- |
| Conventional Example | 100 | 100 | 1.5 |
| Comparative Example | 94 | 86 | −1.2 |
| Example 1 | 101 | 100 | 0.4 |
| Example 2 | 103 | 99 | 0.7 |
| Example 3 | 100 | 99 | 0 |

The results in Table 2 shows that Example tires 1-3 have similar drainage performance and have fuel efficiency and uneven wear resistance in well balanced fashion as compared with Conventional Example tire. On the other hand, Comparative Example tire is inferior to Example tires 1-3 in any of fuel efficiency, drainage performance and uneven wear resistance.

According to the present invention, it is possible to provide a pneumatic tire, especially a heavy load pneumatic tire for a heavy load vehicle such as a truck and a bus, with good fuel efficiency, drainage performance and uneven wear resistance by appropriately providing narrow grooves to define land portion in the center region of the tread surface by several kinds of narrow grooves.

What is claimed is:

1. A pneumatic tire comprising a tread surface provided, on both sides of a pattern center, with a pair of circumferential main grooves extending along a circumferential direction of the tire to define a center region located between the pair of circumferential main grooves, and two side regions located in both sides of the center region, wherein:

the center region is provided with center circumferential narrow grooves including a first circumferential narrow groove located adjacent to the pattern center and extending along the circumferential direction of the tire; a pair of second circumferential narrow grooves located between the first circumferential narrow groove and the respective circumferential main grooves and extending along the circumferential direction; and a plurality of center rib-like land portions including first center rib-like land portions defined by the first circumferential narrow groove and the respective second circumferential narrow grooves, and second center rib-like land portions defined by the respective second circumferential narrow grooves and the respective circumferential main grooves, the center rib-like land portions located next to each other with the center circumferential narrow grooves being therebetween are adapted to supportingly contact with each other when the pneumatic tire is in contact with the ground, the second circumferential narrow groove has a width larger than that of the first circumferential narrow groove, a width of the second center rib-like land portion is more than 105% and not more than 115% of a width of the first center rib-like land portion, the first circumferential narrow groove has a first zigzag shape with a first vertex angle and the second circumferential narrow grooves has a second zigzag shape with a second vertex angle, the second vertex angle being larger than the first vertex angle, the first zigzag shape being offset with the second zigzag shape along the tire circumferential direction, each of the center rib-like land portions is further provided with a plurality of first widthwise grooves extending along a widthwise direction of the tire to dividingly form an array of center block-like land portions, and the center block-like land portions located next to each other with the first widthwise groove being therebetween are adapted to supportingly contact with each other, the center block-like land portions have hexagonal shapes, and in each of the center block-like land portions, a width of a center block-like land portion continuously increases from edges along the circumferential direction toward a center of the center block-like land portion.

2. The pneumatic tire according to claim 1, wherein each of the center circumferential narrow grooves has a zigzag shape formed by circumferentially alternately arranging first groove portions extending at a given first inclination angle from the circumferential direction of the tire and second groove portions extending at a given second inclination angle inversely from the circumferential direction of the tire.

3. The pneumatic tire according to claim 2, wherein the first and second inclination angles of the first and second groove portions of the first circumferential narrow groove are larger than the first and second inclination angles of the first and second groove portions, respectively, of the second circumferential narrow groove.

4. The pneumatic tire according to claim 3, wherein the first and second inclination angles of the first and second groove portions of the first circumferential narrow groove are not more than 50 degrees, the first and second inclination angles of the first and second groove portions of the second circumferential narrow groove are not more than 40 degrees, and the first and second inclination angles of the first and second groove portions of the first circumferential narrow groove are 5-30 degrees larger than the respective ones of the first and second groove portions of the second circumferential narrow groove.

5. The pneumatic tire according to claim 1, wherein the width of the first circumferential narrow groove is 0.5 mm to 1.5 mm, and the width of the second circumferential narrow groove is 2.0 mm to 3.0 mm.

* * * * *